Jan. 17, 1961 J. R. FERRARA ET AL 2,968,503
SNAP RING ASSEMBLY
Filed Oct. 29, 1958

INVENTORS
JOSEPH R. FERRARA
DOUGLAS C. GLAZIER, SR
BY Leonard F. Weklind
ATTORNEY

United States Patent Office 2,968,503
Patented Jan. 17, 1961

2,968,503
SNAP RING ASSEMBLY

Joseph R. Ferrara, Agawam, Mass., and Douglas C. Glazier, Sr., Stafford Springs, Conn., assignors to United Aircraft Corporation, East Hartford, Conn., a corporation of Delaware Filed Oct. 29, 1958, Ser. No. 770,437

7 Claims. (Cl. 287—52)

This invention relates to restraining devices and more particularly to improvements in retaining rings such as snap rings and assemblies for securing machine parts, for example, gears, bearing races, pulleys, and the like against axial displacement on shafts or the like.

It has been found that in some snap rings the axial pressure exerted on the snap ring by the element which it is supposed to retain has been sufficient to distort the snap ring particularly near the split or open ends in the ring, and thus force the ends in the snap ring up out of its retaining groove particularly in the case of shallow rings. In other words, near the open ends or slit in the retaining ring there is a twisting moment which tends to ease the snap ring out of the retaining groove.

It is therefore a primary object of this invention to provide a snap ring having a particular configuration which fits into a mating groove and has a backing member such that the entire assembly is not subject to such forces that can result in the ring's being eased or forced out of the groove.

This and further objects of this invention will become readily apparent from the following detailed description of the drawing in which.

Figure 1:
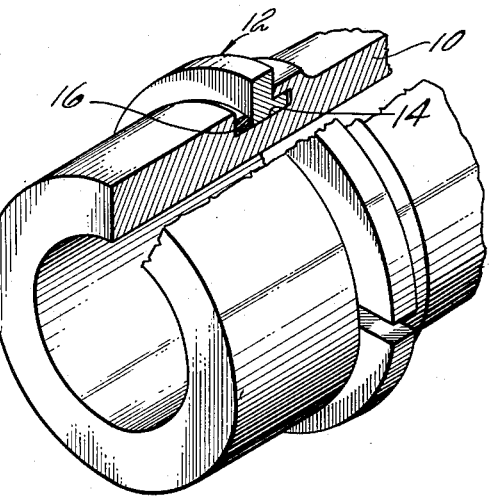
Fig. 1 shows a cut-away perspective view of a shaft having the snap ring of this invention mounted thereon.

Referring to Fig. 1 a shaft or similar member 10 is shown as having mounted thereon a spring-like snap ring or retaining device 12. The snap ring 12 fits into a groove 14 and once in place has positioned next thereto a resilient deformable backing member 16. A device to be axially fixed relative to the shaft 10 can then be slid over the left end of the shaft into engagement with the snap ring 12.

Figure 2:
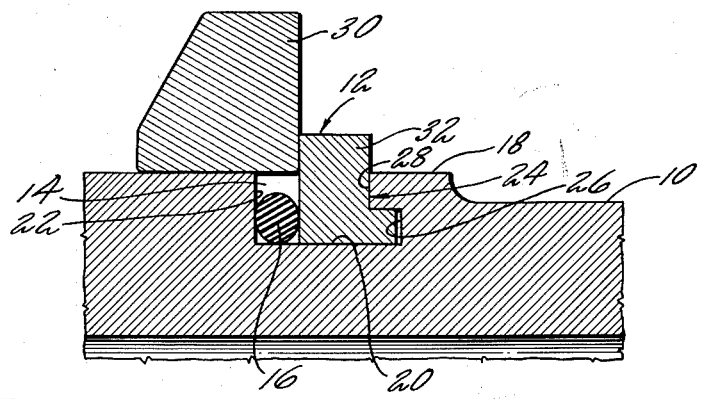
Fig. 2 is a cross section of the Fig. 1 construction with the retained element included therein.

As better seen in Fig. 2 the shaft 10 is cylindrical in shape and includes an outer circular diameter 18. The groove 14 is wider at its inner diameter 20 than it is at its outer diameter near the cylindrical surface 18. The groove has spaced walls 22 and 24 with the portion 26 of the wall 24 being spaced farther from the wall 22 than is the portion 28. The ring 12 as shown in Fig. 2 has its left side substantially parallel to the side 22 of the groove and has its right side in substantial conformity with the wall portions 28 and 26 of the groove. However, the over-all width of the ring 12 is less than that of the groove such that a backing member 16 is provided therein so that the ring fits snugly in the groove. An element 30 which is to be axially restrained relative to the shaft 10 is then put into engagement with the upper portion 32 of the ring which protrudes above the outer diameter 18 of the shaft 10. The shape of the ring in Fig. 2 is that of an L.

Figure 3:
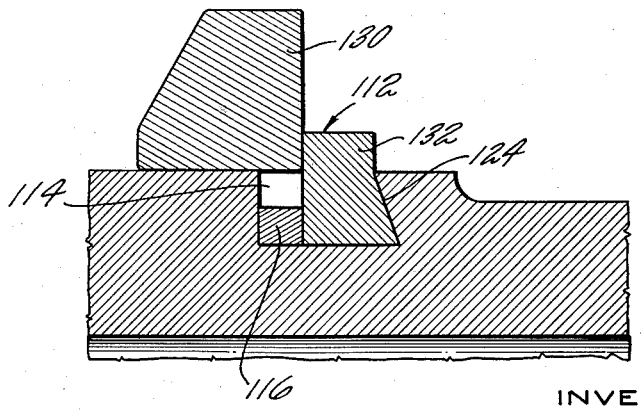
Fig. 3 is a cross section illustrating a modification.

As seen in Fig. 3 the ring 112 and the associated groove 114 are similar in shape to that of the ring 12 shown in Fig. 2 but the right-hand sides 124 of both the groove and the ring have a portion thereof which is beveled, but in each instance the ring is wider at its inner diameter than it is at its outer diameter as also is the groove 114. The backing member 116 can be of a solid material or it can be resilient such as the member 16 of Fig. 2. In this case the element 130 to be restrained is positioned in abutting relation with the outer protruded portion 132 of the ring 112.

Since the cross section (inner protuberance) of the ring 12 prevents deflection in the radial direction and the ring 12 cannot deflect to the left because of the load imposed by element 30 and the ring 12 cannot move to the right because of the presence of wall 24, and further, since twisting of the ring about a point or points on wall 24 as a fulcrum is impossible unless a failure occurs in the ring 12, displacement of the ring from its groove cannot occur under axial loading—regardless of presence of back-up element.

Although only two embodiments of this invention have been illustrated and described herein, it will be apparent that various changes may be made in the construction and arrangement of the various parts without departing from the scope of the novel concept.

What it is desired by Letters Patent is:

1. In combination, a snap ring, a cylindrical member having a groove receiving said ring, an element surrounding said member in substantially close relation and adapted to be held against movement with respect to said member, said cylindrical member having a longitudinal axis, said element including a wall extending transversely of said axis, said groove having a straight side and an opposing side, said sides being closer together at the top of the groove than they are at the bottom of the groove, said ring being open ended and greater in depth than said groove so as to protrude a substantial distance outside of the top of said groove to engage said wall of said element on the side nearest said straight side of said groove, said ring preventing relative movement along said axis of said member with respect to said element, said ring being wider at its inner circumference than at its outer circumference to conform substantially with at least one side of said groove, said ring at its outer circumference being narrower than said groove at its top, and a backing member smaller in depth than said groove and located between said straight side and said ring in the assembled position.

2. A device according to claim 1 wherein the width of said ring becomes progressively greater toward its inner diameter.

3. A device according to claim 1 wherein said ring is L-shaped in cross section throughout its circumferential length.

4. A device according to claim 1 wherein said ring is substantially circular.

5. A device according to claim 4 wherein said ring is uniform in cross section throughout its circumference.

6. A device according to claim 4 wherein said backing member is flexible.

7. A device according to claim 4 wherein said backing member forms a tight fit and is rigid and straight sided.

References Cited in the file of this patent

UNITED STATES PATENTS

| 1,478,486 | Reaume | Dec. 25, 1923 |
| 2,650,843 | Spurgeon | Sept. 1, 1953 |
| 2,822,227 | Droitcour et al. | Feb. 4, 1958 |
| 2,902,303 | Davis | Sept. 1, 1959 |

FOREIGN PATENTS

| 21,748 | Great Britain | 1908 |
| 552,296 | Great Britain | Mar. 31, 1943 |
| 654,804 | Great Britain | June 27, 1951 |